United States Patent
Clasen (10) Patent No.: US 12,024,191 B2
(45) Date of Patent: Jul. 2, 2024

(54) DRIVER ASSISTANCE SYSTEM FOR A VEHICLE, VEHICLE AND A DRIVER ASSISTANCE METHOD IMPLEMENTABLE BY THE SYSTEM

(71) Applicant: Aptiv Technologies AG, Schaffhausen (CH)

(72) Inventor: Henrik Clasen, Dublin (IE)

(73) Assignee: APTIV TECHNOLOGIES AG, Schaffhausen (CH)

(*) Notice: Subject to any disclaimer, the term of this patent is extended or adjusted under 35 U.S.C. 154(b) by 235 days.

(21) Appl. No.: 17/403,534

(22) Filed: Aug. 16, 2021

(65) Prior Publication Data

US 2022/0063655 A1 Mar. 3, 2022

(30) Foreign Application Priority Data

Aug. 28, 2020 (EP) .................................. 20193370

(51) Int. Cl.
*B60W 60/00* (2020.01)
*B60W 30/095* (2012.01)
(Continued)

(52) U.S. Cl.
CPC ...... *B60W 60/001* (2020.02); *B60W 30/0956* (2013.01); *B60W 40/105* (2013.01);
(Continued)

(58) Field of Classification Search
CPC .......... B60W 60/001; B60W 30/0956; B60W 40/105; B60W 2420/52; B60W 2554/80;
(Continued)

(56) References Cited

U.S. PATENT DOCUMENTS 6,556,166 B1 * 4/2003 Searcy .................. G01S 7/4026
343/703
9,174,615 B2 * 11/2015 Takagi .................. G01S 15/931
(Continued)

FOREIGN PATENT DOCUMENTS

CN 107918113 4/2018
CN 109507672 3/2019
(Continued)

OTHER PUBLICATIONS

"Extended European Search Report", EP Application No. 20193370.2, Dec. 1, 2020, 12 pages.

*Primary Examiner* — Mohamed Abdo Algehaim
(74) *Attorney, Agent, or Firm* — Harness, Dickey & Pierce, P.L.C.

(57) ABSTRACT

A driver assistance system for a vehicle having a decision engine and a plurality of active object-detection sensors including two radar sensors mounted at opposed locations on the vehicle relative to a longitudinal centerline of the vehicle. A field of view of each radar sensor is directed away from the centerline and forward of the vehicle and overlaps with the field of view of the other radar sensor in a region of overlap crossing the centerline forward of the vehicle. The decision engine receives signals from the sensors and determines the presence of an object in the regions of overlap on the basis of signals from only each of the two radar sensors among the active object-detection sensors of the system. The decision engine is thus able to command vehicle functions such as braking or acceleration on the basis of the determination.

20 Claims, 7 Drawing Sheets

(51) Int. Cl.
  *B60W 40/105* (2012.01)
  *G01S 13/931* (2020.01)
(52) U.S. Cl.
  CPC ...... *G01S 13/931* (2013.01); *B60W 2420/403* (2013.01); *B60W 2420/408* (2024.01); *B60W 2554/80* (2020.02); *G01S 2013/932* (2020.01); *G01S 2013/9327* (2020.01)
(58) Field of Classification Search
  CPC ........... B60W 2420/42; B60W 30/143; B60W 30/16; B60W 30/18154; B60W 30/09; B60W 30/095; B60W 2420/403; B60W 2420/408; G01S 13/931; G01S 2013/932; G01S 2013/9327; G01S 13/878; G01S 2013/93185; G01S 2013/9319; G01S 2013/9321; G01S 2013/9325; G01S 2013/93271; G01S 2013/93274; G01S 13/10; G01S 13/32; G01S 13/867; G01S 13/42
  USPC ........................................................ 701/23
  See application file for complete search history.

(56) References Cited

U.S. PATENT DOCUMENTS

| | | | | |
|---|---|---|---|---|
| 2005/0197770 A1* | 9/2005 | Schiffmann | ........... | G01S 13/878 701/301 |
| 2006/0092073 A1* | 5/2006 | Boecker | ................ | G01S 13/931 342/128 |
| 2007/0222662 A1* | 9/2007 | Toennesen | ............ | G01S 13/931 342/27 |
| 2007/0291590 A1* | 12/2007 | Harada | ................... | G01S 15/87 367/99 |
| 2008/0266167 A1* | 10/2008 | Baumann | ................ | G01S 17/87 342/52 |
| 2010/0245065 A1* | 9/2010 | Harada | ................. | G01S 15/003 340/435 |
| 2011/0234449 A1* | 9/2011 | Haberland | ............ | G01S 13/931 342/70 |
| 2011/0241857 A1* | 10/2011 | Brandenburger | ....... | G01S 15/87 340/435 |
| 2013/0251194 A1* | 9/2013 | Schamp | ..................... | G06T 7/11 382/199 |
| 2014/0152473 A1* | 6/2014 | Muhlenberg | ........... | G08G 1/166 340/933 |
| 2014/0288799 A1* | 9/2014 | Elwart | .................. | B60W 40/09 701/1 |
| 2015/0112566 A1* | 4/2015 | Takagi | .................. | B60W 10/06 701/70 |
| 2016/0116583 A1* | 4/2016 | Fukuman | ................ | G01S 15/46 342/59 |
| 2016/0116591 A1* | 4/2016 | Fukuman | ................ | G01S 15/46 367/124 |
| 2016/0231746 A1* | 8/2016 | Hazelton | .............. | G05D 1/0274 |
| 2017/0206436 A1* | 7/2017 | Schiffmann | ........... | G01S 13/867 |
| 2017/0219702 A1* | 8/2017 | Matsuura | ................ | G01S 15/878 |
| 2017/0229019 A1* | 8/2017 | Ichinose | ................ | G08G 1/166 |
| 2018/0118146 A1* | 5/2018 | Ito | ............ | G01S 13/58 |
| 2019/0050652 A1* | 2/2019 | Baker | ..................... | H04W 4/46 |
| 2019/0086511 A1* | 3/2019 | Takeuchi | .............. | G01S 7/0235 |
| 2019/0204435 A1* | 7/2019 | Poiger | .................... | G01S 13/878 |
| 2019/0212438 A1* | 7/2019 | Kim | ......................... | G01S 13/42 |
| 2019/0258251 A1* | 8/2019 | Ditty | .................... | G05D 1/0274 |
| 2020/0064483 A1* | 2/2020 | Li | .......................... | G01S 7/4026 |
| 2020/0124716 A1* | 4/2020 | Millar | .................... | G01S 13/726 |
| 2020/0324761 A1* | 10/2020 | Magzimof | ............. | G08G 1/164 |
| 2021/0149041 A1* | 5/2021 | Cho | ......................... | G01S 7/417 |
| 2021/0213946 A1* | 7/2021 | Adwan | ..................... | G01S 17/66 |
| 2022/0111839 A1* | 4/2022 | Jiang | ....................... | G06T 7/593 |
| 2023/0305109 A1* | 9/2023 | Kellner | ..................... | G01S 7/41 |

FOREIGN PATENT DOCUMENTS

| | | |
|---|---|---|
| CN | 109633649 | 4/2019 |
| DE | 102006049879 | 4/2008 |
| EP | 3196668 | 7/2017 |
| WO | 2020030499 | 2/2020 |

* cited by examiner

DRIVER ASSISTANCE SYSTEM FOR A VEHICLE, VEHICLE AND A DRIVER ASSISTANCE METHOD IMPLEMENTABLE BY THE SYSTEM

CROSS-REFERENCE TO RELATED APPLICATION

This application claims priority to European Patent Application Number 20193370.2, filed Aug. 28, 2020, the disclosure of which is hereby incorporated by reference in its entirety herein.

BACKGROUND

This disclosure relates to a driver assistance system for a vehicle, particularly a surface or road-going vehicle, as well as a vehicle implementing the system and a driver assistance method implementable by the system.

Advanced driver assistance systems (ADAS) may be provided to surface or road-going vehicles in order to improve driver comfort and safety, and with the potential to provide autonomous operation of the vehicle.

Such ADAS employ a plurality of vehicle-mounted sensors which provide information about the relative position and relative movement of other objects in the environment in which the vehicle operates, and a decision engine which processes the position information and, as a result, provides information to the driver, autonomously operates vehicle functions, or provides other means of driver support.

ADAS may synthesize or fuse signals from various types of sensors integrated on a vehicle, such as ultrasonic sensors, lidar sensors, radar sensors and cameras, in order to perform various tasks.

In particular, ADAS may include active sensors, which emit radiation, such as ultrasonic, light or microwave radiation, into the environment and which receive reflected radiation from nearby objects. Ultrasonic, lidar and radar sensors are therefore examples of active sensors.

ADAS may also include passive sensors, which rely on radiation emitted or reflected by objects in the environment which originate from another source. Imaging sensors, such as infrared and visible cameras, are examples of passive sensors.

ADAS can typically provide a range of functions relating to different types of driver assistance to be provided, different scenarios in which the vehicle is operated, and differing degrees of autonomy provided by the ADAS system.

One typical function for an ADAS is to provide a forward collision avoidance function. In a forward collision avoidance function, an ADAS recognises the presence of an obstacle in the forward longitudinal direction of travel of the vehicle, and may, for example, autonomously actuate the braking function of the vehicle in order to slow or stop the vehicle. Such a function can avoid a collision or can minimise the impact of the collision.

Another typical function for ADAS is an adaptive cruise control function. In an adaptive cruise control function, an ADAS recognises the presence of one or more other vehicles ahead of the vehicle which is equipped with the ADAS and adjusts the speed of the vehicle within predetermined parameters to avoid closely approaching the one or more vehicles ahead while maintaining forward travel. Such a function can relieve the driver of the need continually to finely adjust the speed of the vehicle to take account of other vehicles ahead, for example by means of the acceleration or brake functions of the vehicle.

A third typical function for an ADAS is a cross-traffic collision avoidance function. In a cross-traffic collision avoidance function, one or more vehicles travelling in a direction to intersect the path of the vehicle equipped with the ADAS are detected, and the ADAS may, for example, autonomously actuate the braking function of the vehicle in order to slow or stop the vehicle. Such a function can avoid a collision or can minimise the impact of the collision.

To support the various functions of the ADAS, the ADAS may be provided with sensors mounted at the vehicle which are capable of delivering signals of a sufficient kind and quality to allow reliable decision-making by the decision engine of the ADAS.

For example, to support a forward collision avoidance function, a long-range forward-looking radar sensor is conventionally provided at a front end of the vehicle, typically on the longitudinal centerline of the vehicle, to detect obstacles at a sufficient distance ahead of the vehicle to allow for safe and effective automated braking of the vehicle even at highway speeds in excess of, for example, 100 kilometers per hour.

In contrast, to support an adaptive cruise control function, signals from such a forward-looking radar may conventionally be combined with signals from a forward-looking camera to provide for speed regulation while following another vehicle at typical traffic distances and typical traffic speeds.

In further contrast, to support a cross-traffic collision avoidance function, shorter-range but wider-angle radars may be provided at each corner of the front of the vehicle, each angled away from the longitudinal axis of the vehicle, each such radar detecting potential vehicles moving across the longitudinal direction of travel of the vehicle.

The competing requirements of the various sensors necessitate the provision of a large number of sensors each having specialised capabilities in order to support the various functions of the vehicle. This increases the cost and complexity of providing a vehicle with an ADAS capability.

In recent systems, it has been proposed to synthesise the signals from selected sensors on the vehicle to provide an improved overall environmental awareness on the basis of which decision-making by the ADAS can be performed, for example to support advanced ADAS functions such as autonomous or self-driving vehicles. Synthesising a large number of signals is computationally complex, and therefore leads to high signal-processing capabilities of the ADAS.

It is accordingly advantageous to provide an ADAS which can deliver the functionality of conventional ADAS at reduced cost and complexity.

SUMMARY

According to a first aspect of the present disclosure, there is provided a driver assistance system for a vehicle. The driver assistance system comprises a plurality of active object-detection sensors for mounting at the vehicle. The driver assistance system comprises a decision engine. The decision engine receives signals from the object-detection sensors. The plurality of sensors comprises two radar sensors. The two radar sensors are for mounting at opposed locations on the vehicle relative to a longitudinal centerline of the vehicle. A center of a field of view of each radar sensor is directed away from the centerline. The field of view of each radar sensor overlaps with the field of view of the other radar sensor in a region of overlap crossing the centerline. The region of overlap is forward of the vehicle. The decision engine determines the presence of an object in the region of overlap on the basis of signals from, of the active object-detection sensors, only each of the two radar sensors.

The decision engine may output, at least in part on the basis of the determination, a command for an operation of the vehicle.

The decision engine may output a command for autonomously actuating the braking and/or acceleration of the vehicle on the basis of signals from, among the plurality of active object-detection sensors, only each of the two radar sensors. The signals represent the presence of an object in the region of overlap.

The field of vision of each radar sensor may be at least 90 degrees, optionally at least 120 degrees, optionally at least 150 degrees.

A detection range of each radar sensor may be at least 150 meters, optionally at least 200 meters.

The angular discrimination of each radar sensor may be at least 4 degrees at a facing direction of the radar sensor.

The decision engine may be configured to receive an actual speed measurement of the vehicle and a demanded speed measurement of the vehicle. The decision engine may regulate the speed of the vehicle relative to a detected object in the region of overlap on the basis of the demanded speed and signals, from among the plurality of active object-detection sensors, only from the two radar sensors.

The decision engine may be configured to regulate the speed of the vehicle at speeds of at least 100 kilometers/hour.

The decision engine may be configured to output a command for autonomously actuating the braking and/or acceleration of the vehicle on the basis of signals representative of detection of an object by the sensors in the region of overlap at a distance of at least 75 meters, optionally at least 100 meters from the vehicle.

The system may comprise, of the active object-detection sensors which are radar sensors, only two radar sensors which are arranged forward of a longitudinal midpoint of the vehicle. The radar sensors may be arranged respectively at the front corners of the vehicle. The system may comprise further radar sensors which are arranged rearward of the longitudinal midpoint of the vehicle.

The radar sensors may have a radio frequency of at least 76 gigahertz, optionally not exceeding 81 gigahertz.

The driver assistance system may further comprise an imaging sensor for mounting at the vehicle. The mounting may be with a field of view overlapping with the region of overlap of the fields of view of the radar sensors. The decision engine may determine the presence of an object in the region of overlap on the basis of signals additionally from the imaging sensor representing the presence of an object in the region of overlap.

The decision engine may be configured to output a command for autonomously actuating the braking and/or acceleration of the vehicle on the basis of signals, from, among the plurality of active object-detection sensors, only each of the two radar sensors, and additionally from the imaging sensor.

The camera may have a resolution of at least 1 megapixels, optionally at least 4 megapixels. The camera may have a field of view of at least 90 degrees, optionally at least 120 degrees.

The decision engine may additionally output a command for autonomously actuating the braking or acceleration of the vehicle on the basis of signals, from among the plurality of active object-detection sensors, only one of the two radar sensors.

According to a second aspect of the present disclosure, there is provided a vehicle equipped with the driver assistance system of the first aspect.

According to a third aspect of the present disclosure, there is provided a driver assistance method for a vehicle. The method comprises receiving signals from a plurality of active object-detection sensors. The plurality of active object-detection sensors is mounted at the vehicle. The plurality of sensors comprises two radar sensors. The two radar sensors are mounted at opposite locations on the vehicle relative to a longitudinal centerline of the vehicle. A center of a field of view of each radar sensor is directed away from the centerline and forward of the vehicle. The field of view of each radar sensor overlaps with the field of view of the other radar sensor in a region of overlap crossing the centerline. The method comprises determining the presence of an object in the region of overlap on the basis of signals from, among the plurality of active object-detection sensors, only each of the two radar sensors.

BRIEF DESCRIPTION OF THE DRAWINGS

For a better understanding of the present disclosure, and to show how the same may be carried into effect, reference is made, by way of example only, to the accompanying drawings, in which.

DETAILED DESCRIPTION

Figure 1:
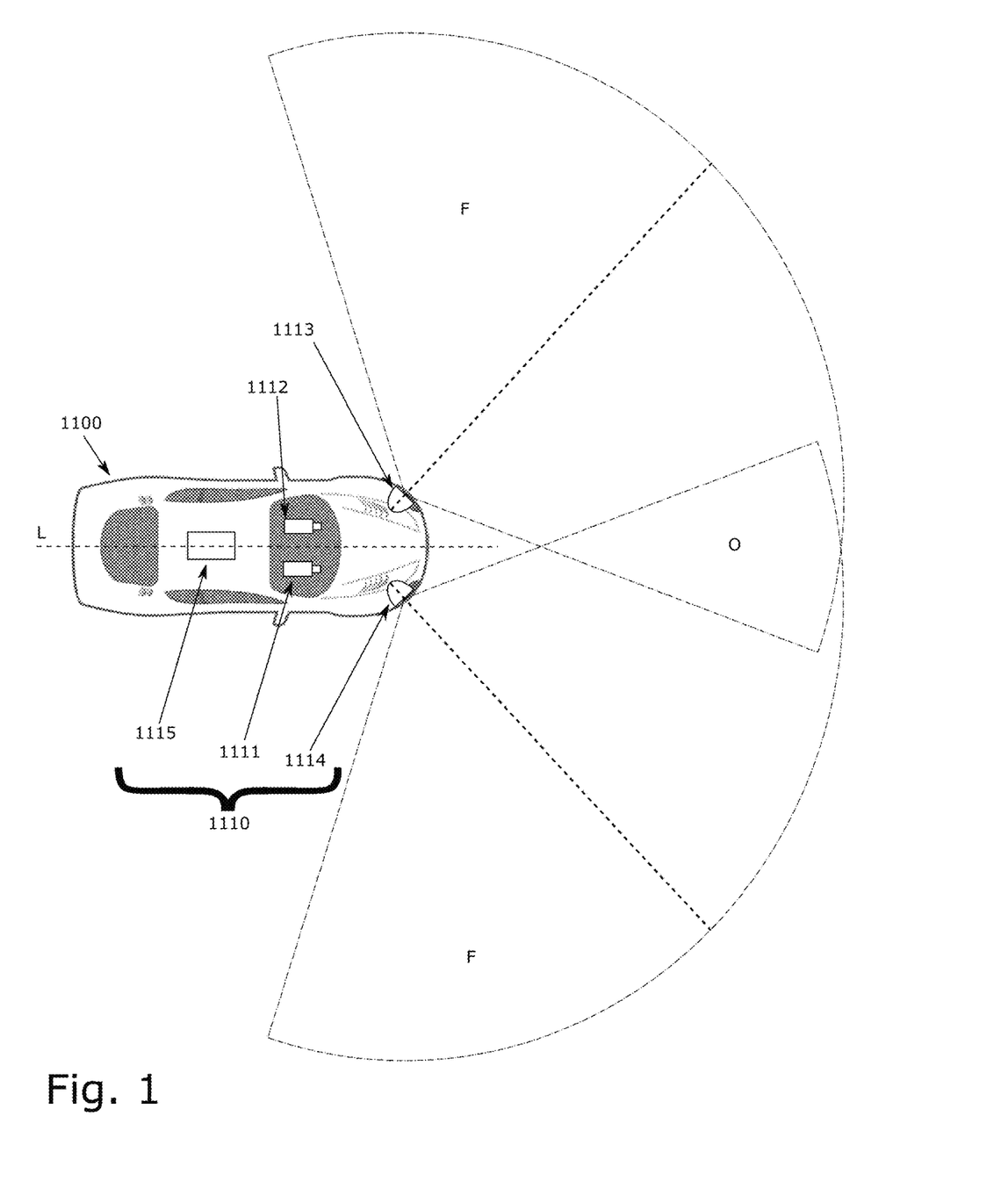
FIG. 1 shows a vehicle equipped with an embodiment of a driver assistance system being an embodiment of the present disclosure.

FIG. 1 shows a vehicle 1100 equipped with a driver assistance system 1110 being an embodiment of the present disclosure. Driver assistance system 1110 includes, for example, controller 1115 connected to cameras 1111 and 1112 and radar sensors 1113 and 1114. Driver assistance system 1110 may include other elements, in particular other sensors, both active and passive, but the present embodiment is explained with reference to the configuration shown in FIG. 1.

In driver assistance system 1110, radar sensors 1113 and 1114 are mounted respectively at front corners of the vehicle, on opposite sides of a vehicle longitudinal centerline L, in mirror-image positions across this centerline. Longitudinal centerline may be regarded as the direction that the vehicle travels in normal, straight forward motion, and typically defines an overall plane of reflective symmetry of the vehicle 1100. For a vehicle with front and rear wheels, the direction of straight, forward motion may be regarded as the direction of motion when the front and rear wheels align and rotate at the same speed.

Each radar sensor 1113, 1114 transmits continuous-wave (CW) or pulsed radio or microwave radiation with an angular distribution centered around a facing direction of the radar sensor. Radar sensor 1113, 1114 also receives reflected or scattered radio or microwave radiation from the environment, for example reflected or scattered by objects which the radar sensor faces. Based on the radiation received, the radar sensor may return information representing the range and bearing relative to the radar sensor of one or more objects in the environment, which information is typically referred to as one or more radar tracks. In practice, extended objects in the environment tend to return multiple signals, from which the scale of the object can also be derived.

Additionally, radar sensors 1113, 1114 may have the capability to measure the movement of the one or more objects, including relative velocity of the object or objects in a direction across or along the direction from the sensor to the object, for example by Doppler shift measurement.

As shown in FIG. 1, each radar sensor 1113, 1114 is characterised by a horizontal field of view which typically extends an equal angular amount in horizontal azimuth either side of the facing direction of the sensor. The horizontal azimuth of each sensor may be at least 90 degrees, optionally at least 120 degrees, further optionally at least 150 degrees. Although each radar sensor is also characterised by a vertical field of view, beyond that such a field of view may be sufficiently restricted to avoid unwanted reflections from the ground surface or objects above the height of the vehicle, the vertical field of view is not further discussed.

Moreover, each radar sensor 113, 114 is characterised by a detection range, which may be determined by the power of the radar signal emitted by the sensor and the detection sensitivity of the sensor. The range of each sensor may be at least 150 meters, optionally 200 meters.

Finally, each radar sensor 1113, 1114 is characterised by an angular discrimination, which is the angular separation of objects which can be resolved by the sensor. Typically, the angular discrimination of a radar sensor decreases for objects at azimuthal positions away from the facing direction of the sensor, and so radar sensors are typically characterised in terms of angular discrimination for objects lying on a line extending in the facing direction. The angular discrimination of each radar sensor may be at least 4 degrees.

As shown in FIG. 1, radar sensors 1113 and 1114 are arranged on vehicle 1100 so as to face outwardly relative to the longitudinal centerline L of the vehicle, such that the field of view of the sensor extends at least to include an angle, relative to the longitudinal centerline direction of the vehicle, of 90° or more.

Moreover, the facing direction of each radar sensor 1113, 1114 is selected in conjunction with the field of view of the sensor such that a region of overlap O exists between the field of view of sensor 1113 and sensor 1114 through which the centerline L of the vehicle extends. The facing direction may, for example, be for each sensor between 40 and 60 degrees, preferably 50 degrees, away from the centerline of the vehicle The region of overlap may, for example, extend between a range of 10 meters to 200 meters ahead of the vehicle. Thereby, when an object is present ahead of the vehicle 1100, at least for objects lying on the centerline of the vehicle, each of radar sensor 1113 and radar sensor 1114 may generate a signal indicating the presence of that object.

The radar sensors may operate, for example, in a frequency band of 76 gigahertz to 81 gigahertz.

By such an arrangement, as further explained below, by using a combination of the signals from radar sensor 1113 and radar sensor 1114, ADAS controller 1115 can determine the presence of obstacles ahead of the vehicle as it travels in the longitudinal direction.

Moreover, when an object is arranged forward of the vehicle but sufficiently far away from the longitudinal centerline of the vehicle, and therefore away from the region of overlap O, either radar sensor 1113 or radar sensor 1114 may generate a signal indicating the presence of that object in the field of view of the sensor. Accordingly, by using only the signal from either radar sensor 1113 or radar sensor 1114, controller 1115 can determine the presence of obstacles crossing the direction of travel of the vehicle.

Figure 2:
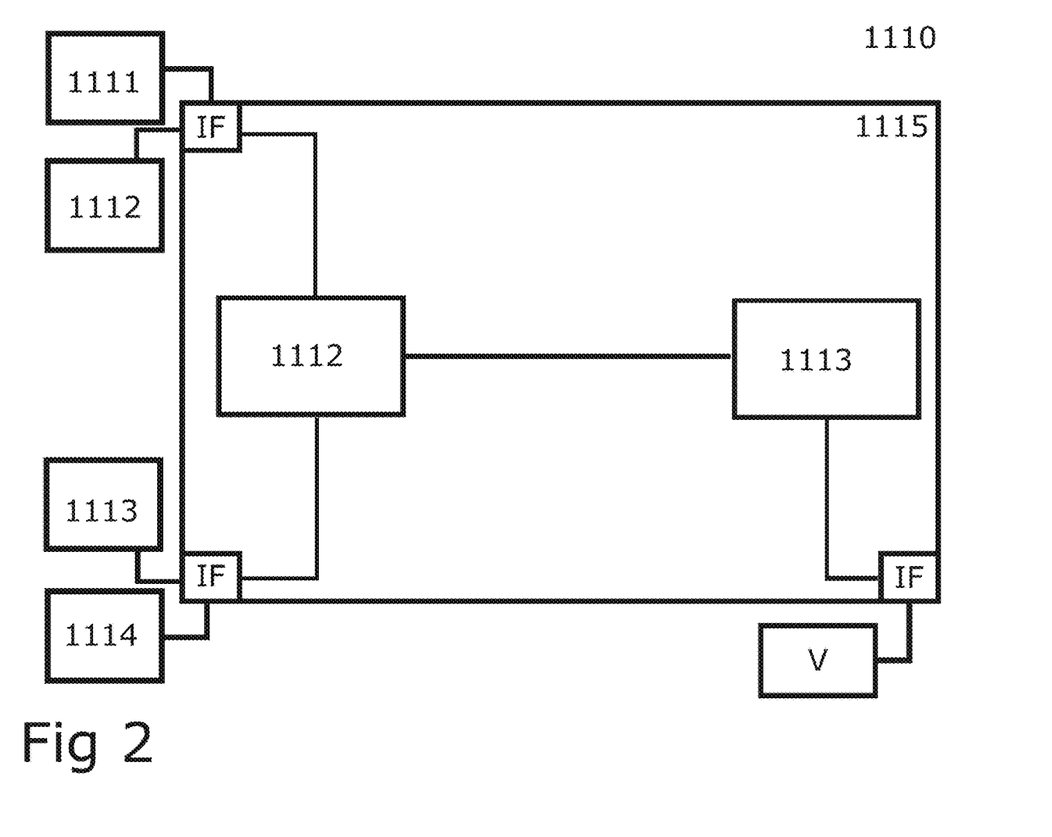
FIG. 2 shows a schematic block diagram of a driver-assistance system being an embodiment of the present disclosure.

FIG. 2 shows a schematic block diagram of ADAS system 1110, in particular comprising controller 1115 together with cameras 1111 and 1112 as well as radar sensors 1113 and 1114.

As shown in FIG. 2, cameras 1111 and 1112 and radar sensors 1113 and 1114 are connected to controller 1115 via interface connectors IF.

The signals from cameras 1111 and 1112 and the signals from radar sensors 1113 and 1114 are supplied to fusion module 1112, which processes the signals to identify objects in the environment of the vehicle.

For example, fusion module 1112 may receive signals from radar sensor 1113 or 1114 indicating the presence of an object at a certain range and azimuth relative to the facing direction of that sensor and may, by trigonometry, identify an object as being located at a position relative to the vehicle which corresponds to that range and azimuth. To allow such a determination, fusion module may be provided with configuration information representing the position and facing direction of the sensors.

When fusion module 1112 receives signals from radar sensors 1113 and 1114 indicating the presence of an object at a certain range and azimuth relative to each of the facing directions of those sensors, such that the object lies in the region of overlap O, the fusion module 1112 performs a sensor fusion operation on the signals and identifies a single object as being located at a position in the region of overlap.

By providing radar sensors 1113 and 1114 angled with the facing direction away from the longitudinal centerline L of vehicle 1100, accurate detection of objects approaching the direction of travel of vehicle 1100 from a position away from the centerline of the vehicle can be achieved by making use of the good angular discrimination of radar sensors 1113 and 114 at angles close to the facing direction of each radar sensor.

Moreover, by performing sensor fusion on the signals from radar sensors 1114 and 1113 to detect objects in the region of overlap, the decreasing angular discrimination of radar sensors 1113 and 1114 for signals reflected from an azimuthal position away from the facing direction of each of radar sensors 1113 and 1114 may be mitigated. Therefore, a more accurate determination of the position and range of an object in the region of overlap O lying on the centerline L of the vehicle can be attained.

Such accuracy can be comparable to the accuracy required for a single forward-looking radar used for, for example, automated emergency braking or adaptive cruise control functionality. Hence, by providing such a configuration of sensors, there is no requirement to provide a single forward-looking radar in addition to the front corner radar sensors 1113 and 1114, and the cost and complexity of the system can be reduced.

Information about the position of objects in the environment around vehicle 1100 is received from fusion module 1112 by decision module 1113. Decision module 1113 implements a decision engine which, based on the information about the position of objects in the environment around vehicle 1100, issues commands via a suitable interface IF to vehicle systems, represented by vehicle controller V. Access to vehicle controller V can, for example, be provided by a common interface bus interfaced to discrete controllers for acceleration, braking, steering, and the like, or can be provided by a single vehicle controller controlling all or a subset of these functions.

In the present embodiment, decision module 1113 is adapted to perform functions including automatic emergency braking or adaptive cruise control by actuating the braking function and/or, appropriately, the acceleration function in particular operational scenarios.

Figure 3:
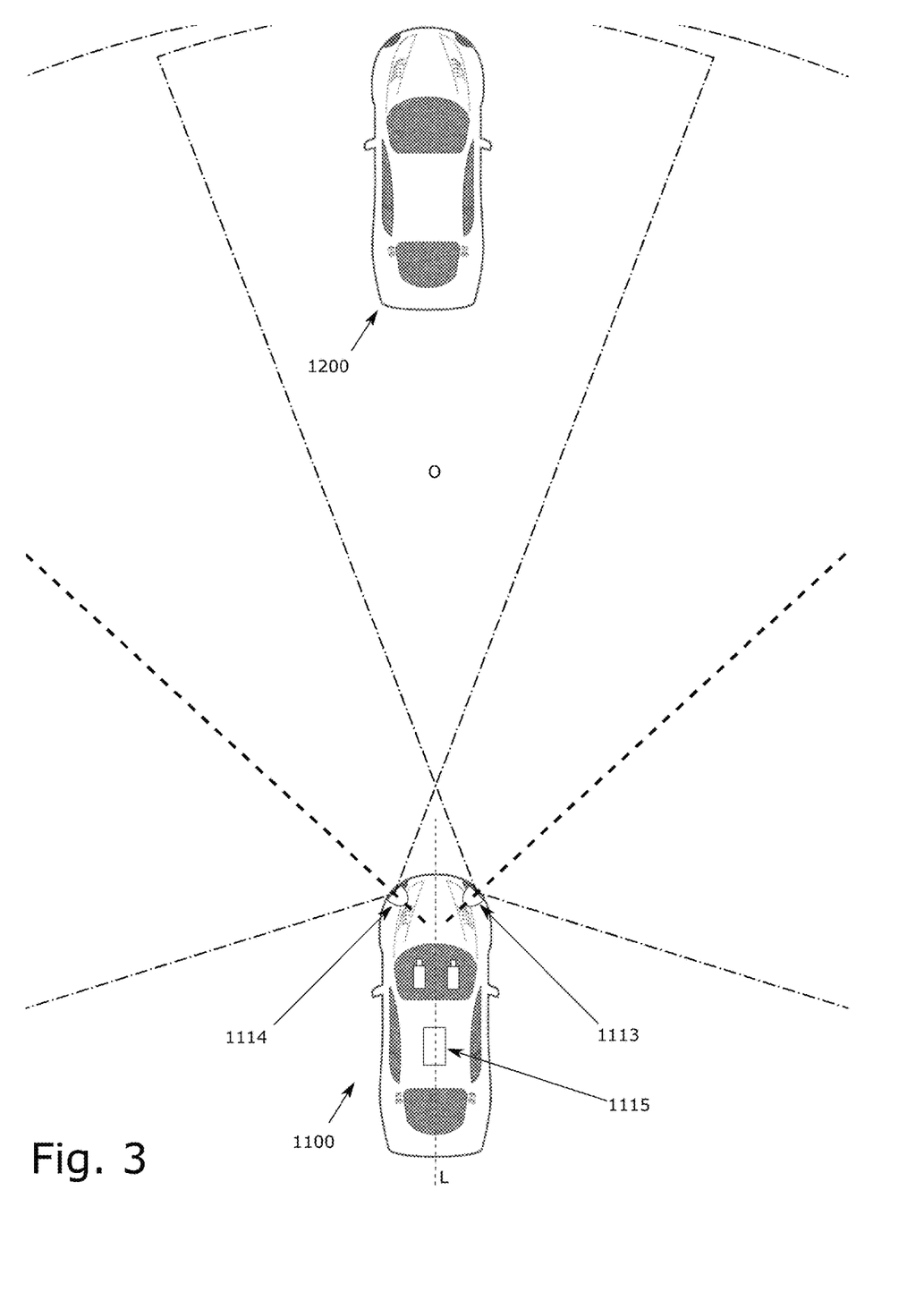
FIG. 3 shows a vehicle equipped with a driver-assistance system being an embodiment of the present disclosure in a forward collision avoidance or adaptive cruise control scenario.

One such operational scenario is shown in FIG. 3. In FIG. 3, vehicle 1100 is approaching another vehicle 1200 located along the longitudinal direction of travel of vehicle 1100. In FIG. 3, vehicle 1200 may be stationary or may be travelling at a slow speed, while vehicle 1100 may have a forward speed of at least 100 kilometers per hour. In this situation, FIG. 3 represents a forward collision avoidance scenario.

As vehicle 1100 travels towards vehicle 1200, vehicle 1200 enters into the region of overlap defined between the field of view of radar sensor 1113 and radar sensor 1114. When it does so, radar sensor 1113 and radar sensor 1114 each generate signals representing an object in their respective fields of vision at corresponding positions, within the common region of overlap O. Radar sensors 1113 and 1114 may generate signals for an object at a range of at least 75 meters, optionally at least 100 meters.

When radar sensor 1113 and radar sensor 1114 each generate such signals, fusion module 1112 receives the signals and determines that the signals relate to a single object. For example, fusion module 1112 may determine that the signals relate to a single object when the azimuth and bearing of each signal overlap are the same or are sufficiently similar in a frame of reference defined with respect to the vehicle 1100. In such a situation, fusion module 1112 outputs information indicating the presence of vehicle 1200 at a defined position within the vehicle frame of reference, for example by a range and an angle from vehicle 1100's longitudinal centerline, at which object 1200 is located.

Fusion module 1112 sends the information indicating the presence of vehicle 1200 at a position along longitudinal centerline L to decision module 1113, which receives from the vehicle systems the information about the speed of travel of the vehicle and the current status of driver control input, including, for example, the current status of the driver control input to the brakes. The speed of travel of the vehicle in the longitudinal direction may be determined, for example, by received GPS data, and/or from the speedometer function of the vehicle, and may be received through vehicle controller V or from a discrete speed-reporting unit.

Additionally, decision module 1113 may receive input can regarding the state of a steering input of the vehicle 1100, for example whether the driver has set a steering position to cause the vehicle to deviate from a straight-line direction of travel.

Under appropriate circumstances, for example when decision module 1115 determines that vehicle 1100 is approaching rapidly vehicle 1200 without corrective action being taken by the driver, for example without actuation of the steering or brakes so as to avoid a collision, or where decision module 1113 determines, for example, that the corrective input by the driver as it inadequate to prevent a collision with vehicle 1200, decision module 1115 may initiate corrective action such as applying the brakes partially or fully so as to slow or stop the rate of approach from vehicle 1100 toward 1200.

Decision module 1115 may initiate such corrective action by issuing appropriate commands to the vehicle systems, such as the steering, acceleration, or braking functions, via vehicle controller V. At this time, decision module 1115 may also command the operation of other safety-relevant systems, for example by activating seat belt pre-tensioners or arming airbags in anticipation of a possible collision. Decision module 1113 may determine the degree of corrective action based on a determined minimum safe corrective action which can avoid the collision. Thereby, excessive longitudinal or lateral forces in the collision avoidance operation may be avoided.

In the scenario depicted in FIG. 3, due to the overlapping of the field-of-view of radar sensor 1114 and 1113 at a location along the vehicle centerline L, effective identification of an obstacle in the path of vehicle 1100, such as vehicle 1200, can be performed even without the conventional provision of a forward-looking radar sensor at the front of vehicle 1100 having a field of vision centerd on centerline L, so as to permit appropriate automatic emergency braking to be performed.

In a variant of the scenario depicted in FIG. 3, vehicle 1200 is not stationary or slowly moving, but is travelling at normal traffic speed, such as a normal highway speed, for example in excess of 100 km an hour. Vehicle 1100 is also travelling at a similar speed, but at a speed slightly in excess of the speed of vehicle 1200. As a result, vehicle 1100 may be approaching vehicle 1200 at a slow closing speed of, for example, up to 30 kilometers per hour.

Moreover, in this scenario vehicle 1100 is operating in so-called adaptive cruise control mode, in which the accelerator and brake functions of the vehicle 1100 are operated under direct control of ADAS controller 1115 even without ongoing control input by the driver of the vehicle. For example, a cruise speed may be set by the driver using an appropriate control interface in the vehicle, and the ADAS controller may record that speed as a desired maximum speed of the vehicle.

By obtaining measurements of the vehicle speed from, for example, vehicle systems V, such as from the speedometer or GPS unit, ADAS controller 1115 may command application of acceleration and/or braking function to maintain vehicle speed at the desired maximum speed of the vehicle in the absence of detected obstacles ahead of the vehicle.

Under such a mode of operation, vehicle 1100 may approach from behind another vehicle 1200 travelling in approximately the same direction at a similar speed. Under this condition, vehicle 1200 is present within overlap region O between the field of view of radar sensor 1113 and the field of view of radar sensor 1114. Just as for the situation in a depicted in FIG. 2, fusion module 1112 may identify, based on the signals from radar sensor 1113 and the signal from radar sensor 1114 the presence of an object in the region of overlap along the longitudinal direction of travel of vehicle 1100 and is able to provide the information of this object to decision module 1113.

In the situation described, decision module 1113 is able to identify that vehicle 1200 is travelling at a similar speed to that of vehicle 1100. For example, decision module 1113 may determine a closing rate between vehicle 1100 and vehicle 1200. Under this condition, decision module 1113 may determine that the speed of vehicle 1100 is to be progressively reduced to a speed comparable to that of vehicle 1200 to achieve and subsequently maintain a safe separation in the longitudinal direction of travel between vehicle 1100 and vehicle 1200.

Under such a mode of operation, ADAS controller 1115 is able to cause vehicle 11002 follow the speed of vehicle 1200 by issuing commands to vehicle systems the to operate the acceleration and brake functions to maintain a safe separation even when vehicle 1200 changes speed, for example by accelerating or braking.

Moreover, if vehicle 1200 moves out of the longitudinal path of vehicle 1100, decision module 1113 may issue commands to vehicle systems including the acceleration function of the vehicle to cause the vehicle to accelerate to the maximum speed.

The safe separation distance may be predetermined in the ADAS controller, may be selected by the driver, or may be determined, for example, on the basis of a present speed of vehicle 1100, for example, to ensure an appropriate safety distance if vehicle 1200 suddenly reduce its speed by a large amount, or stop.

Figure 4:
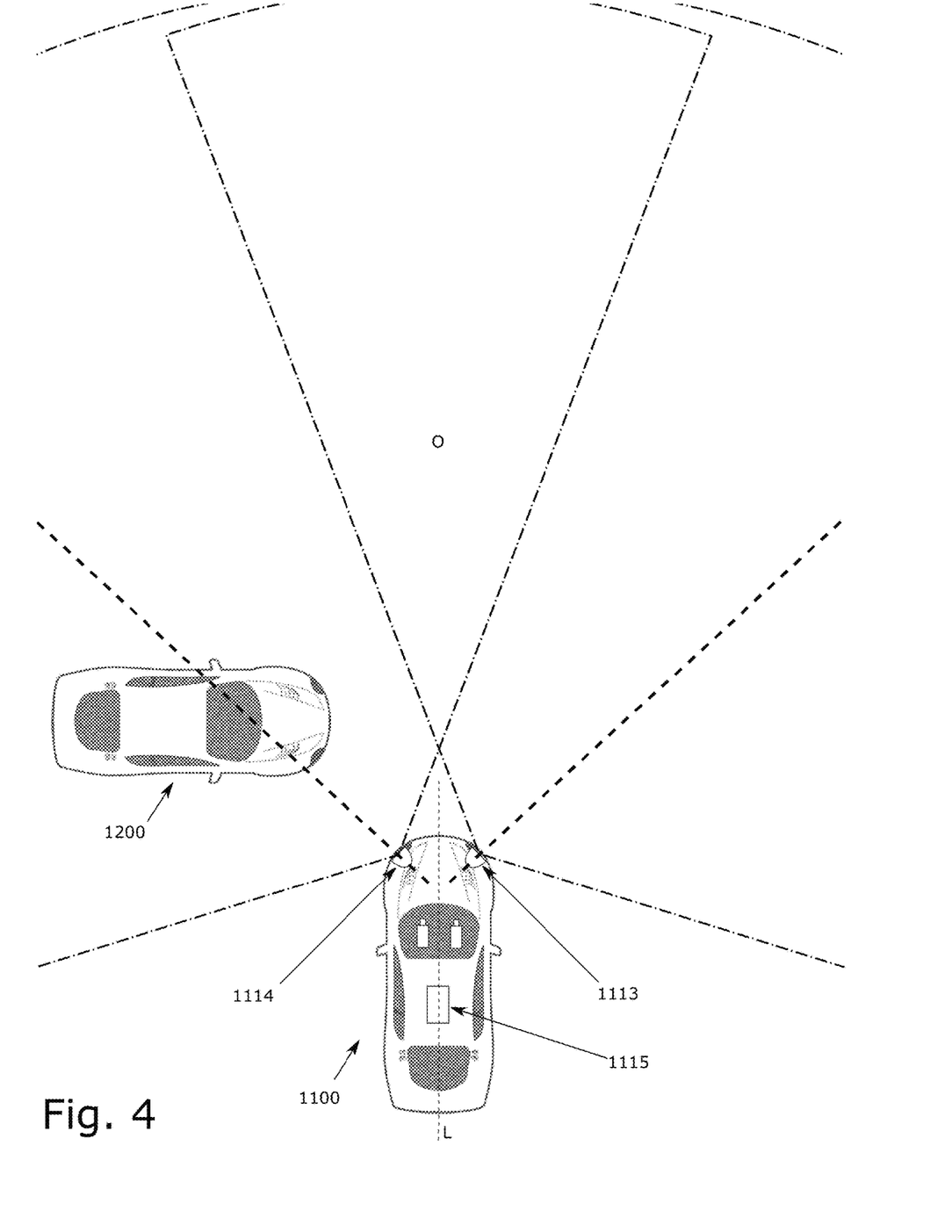
FIG. 4 shows a vehicle equipped with a driver-assistance system being an embodiment of the present disclosure in a cross-traffic collision avoidance scenario.

As shown in FIG. 4, the configuration of radar sensors 1113 and 1114 of vehicle 1100 is also able to provide cross-traffic collision avoidance functionality. In FIG. 4, vehicle 1200, rather than being ahead of vehicle 1100 in the longitudinal direction of travel of vehicle 1100 as shown in FIG. 3, approaches the future path of travel of vehicle 1100 from the side, in a direction crossing the direction of travel of vehicle 1100.

In the situation shown in FIG. 4, radar sensor 1114 generates a signal representing the presence of an object in its field of view, but radar sensor 1113 does not. Accordingly, based on the signal from radar sensor 1114, fusion module 1112 determines the location of an object at the position of vehicle 1200 in the frame of reference of the vehicle 1100 and provides this information to decision module 1113.

On the basis of the information and information about, for example, the speed of vehicle 1100, decision module 1113 determines whether there is a likelihood that, unless corrective action is taken, vehicle 1100 and vehicle 1200 may closely approach or collide. For example, decision module 1113 may determine that correction action is to be taken if vehicle 1100 and vehicle 1200 are likely to pass within a predetermined distance of one another.

If decision module 1113 determines that vehicle 1100 and vehicle 1200 may closely approach or collide, then decision module 1113 may issue commands to vehicle systems V to take corrective action, for example by actuating a braking function of the vehicle. Decision module 113 may also actuate or arm other safety-relevant systems such as seat belt pre-tensioners and airbags.

The scenario shown in FIG. 4 is may be properly handled by decision module 1113 since vehicle 1200 is detected at a position approaching or crossing the facing direction of radar sensor 114, at which azimuth radar sensor 1114 has generally good angular discrimination. Therefore, decision module 113 is able to correctly determine the likelihood of a collision, even though only one radar module 1114 is facing vehicle 1200.

Accordingly, having reference to FIG. 3 and FIG. 4 together, it may be seen that only two radar sensors 1113 and 1114 are appropriately able to generate signals to permit both forward collision avoidance and side collision avoidance, as well as, optionally, an adaptive cruise control function, without the need additionally to arrange a forward-facing radar sensor at the front of the vehicle.

Although the present disclosure has been described and exemplified in a configuration in which only active sensors are used as inputs to fusion module 1112, as shown in FIG. 1 vehicle 1100 may be equipped with passive sensors such as cameras 1111 and 1112.

Cameras 1111 and 1112 are imaging sensors which are arranged rearward of radar sensors 1113 and 1114 and are typically positioned at an elevated position relative to radar sensors 1113 and 1114. For example, cameras 111 and 112 may be positioned below the roofline of the vehicle, facing forward along the longitudinal direction of the vehicle and angled slightly downwards so that each camera captures images of a region in front of the vehicle. Although it is possible to use only one camera in this regard, the present embodiment provides two cameras in order to allow a stereoscopic image to be obtained, in which depth information about elements of the scene viewed by the cameras 1111 and 112 can straightforwardly be determined.

Each camera may have a resolution of at least 1 megapixels, with increased resolution, such as at least 4 megapixels, providing improved imaging capability. Each camera may have a field of view of at least 90 degrees, with increased field of view, such as at least 120 degrees, providing an increased ability to image objects away from the facing direction of each camera.

Figure 5:
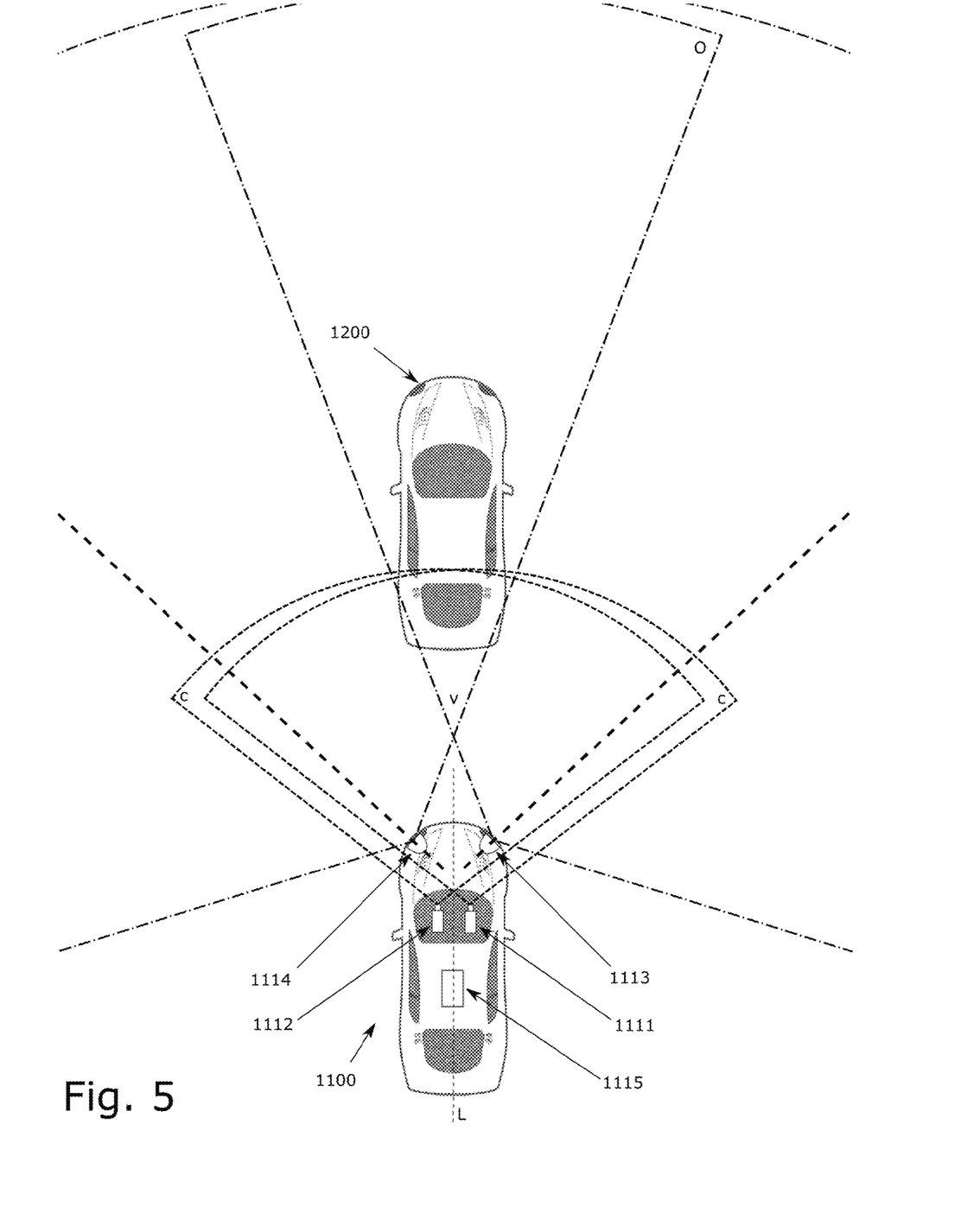
FIG. 5 shows a vehicle equipped with a driver assistance system being another embodiment of the present disclosure in a forward collision avoidance or adaptive cruise control scenario.

Such a configuration is shown in FIG. 5, in the context of providing forward collision avoidance or adaptive cruise control functionality.

As can be seen in FIG. 5, each camera 1111 and 1112 has a horizontal field of view C, which respective fields of view at least partially overlap in a region V in front of vehicle 1100. Each camera is also characterised by a range, which may, for example, be determined by the downward angle of tilt of the camera relative to the plane of the road surface over which the vehicle 1100 is moving and the vertical field of view of the camera.

During a period when vehicle 1200 is outside of the range of cameras 1113 and 114, the situation is in all material respects similar to that of FIG. 3, with ADAS controller 1115 determining that vehicle 1200 is present in an overlap region between the fields of view of sensors 1113 and 1114 on the basis of signals from radar sensors 1113 and 1114, and applying a forward collision avoidance or adaptive cruise control functionality accordingly.

However, in the situation shown in FIG. 5, vehicle 1200 is present in a portion of region of overlap which is relatively close to the front of vehicle 1100. Accordingly, the ranging accuracy of radar sensors 1113 and 1114, that is, the accuracy with which they can determine the distance from the sensor 1113 to the vehicle 1200, may be insufficient to correctly determine whether or not, for example, emergency braking action or other actuation of vehicle systems may be required. This situation is relevant, for example, when the vehicle is moving in city traffic or slow-moving queued traffic on a highway.

Accordingly, when object 1200, or a part thereof, lies within field of view of cameras 1111 and 1112, object-recognition and image-processing algorithms may be performed by fusion module 1112 on the signals received from cameras 1111 and 1112 to identify and locate object 1200 in the field of view of cameras 1111 and 1112. Fusion module 1112 may then provide information about the position and movement of vehicle 1200 to decision module 1113 in the same way as for information about the position of movement of object 1200 based on signals from sensors 1113 and 1114.

In some embodiments, when vehicle 1200 or another object is sufficiently close to the front of vehicle 1100 to allow object 1200 to be detected and located by means of cameras 1111 and 1112, fusion module 1112 may preferentially supply this information to decision module 1113 such that decision module 1113 exclusively uses information about object 1200 derived from cameras 1111 and 1112 to actuate vehicle functions.

However, it is also possible for fusion module 1112 to associate the position and movement of object 1200 determined using cameras 1111 and 112 with the position and movement object 1200 determined using radar sensors 1113 and 1114, thereby to provide an overall estimate of the position and movement of object 1200 using data from each of these sensors in a so-called consensus estimate.

Figure 6:
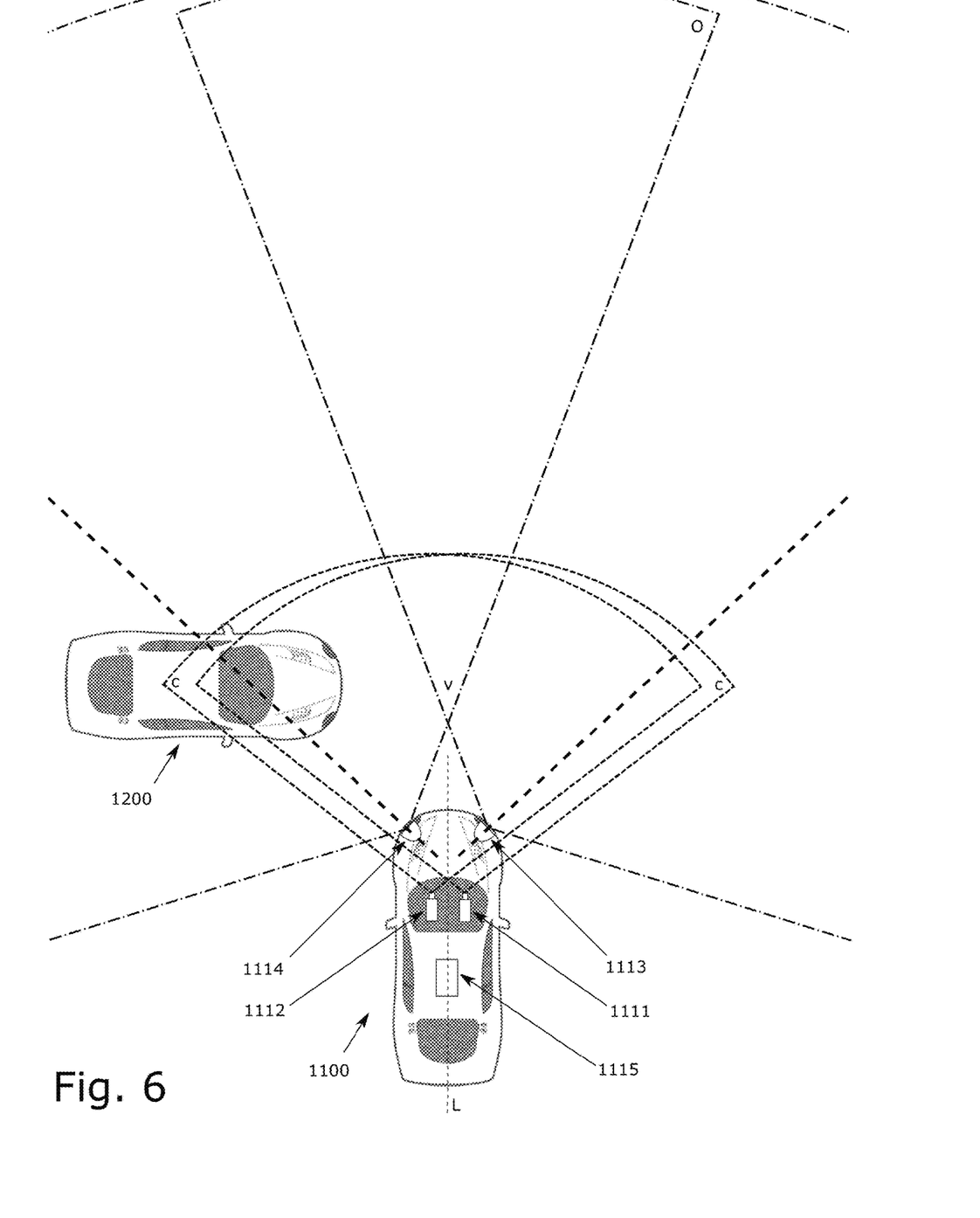
FIG. 6 shows a vehicle equipped with a driver assistance system being another embodiment of the present disclosure in a cross-traffic collision avoidance scenario.

FIG. 6 shows a similar situation to that of the cross-traffic collision avoidance scenario explained with reference to FIG. 4, except, just as for FIG. 5, in FIG. 6, signals from cameras 1113 and 1114 are also available to ADAS controller 1115 for use in decision-making. Again, this may provide advantages in terms of accuracy when vehicle 1200 approaches closely to the front of vehicle 1100.

The above explanations have been given with respect to a vehicle which is depicted as a car, but the disclosure is not limited to such a configuration. For example, vehicle 100 may be, for example, a van or truck, without limitation.

The above disclosure has been exemplified with regard to active sensors which are radar sensors, but the above disclosure may be applied to other types of active sensors, such as ultrasonic sensors or lidar sensors, without limitation.

The above disclosure has been exemplified with regard to cameras 1112 and 1111 which form a stereoscopic camera pair, but the above disclosure can be implemented in a configuration in which only a single forward-facing camera is provided. In such configurations, the single camera may be provided on the vehicle centerline and may be positioned rearward of radar sensors 1113 or on an axis connecting radar sensors 1113 and 1114. Alternatively, no camera may be present.

In the above disclosure, a general explanation of the operation of fusion module 1112 has been given, since sensor fusion strategies are generally known in the art. In practice, fusion module 112 may be implemented in a variety of configurations, including using well-known sensor-fusion, tracking and estimation algorithms, including those based on Bayesian inference.

One particular sensor fusion approach which may have utility in implanting the present disclosure is that disclosed in, for example, European patent application EP17150307.1, published as EP 3 196 668 A1, which is incorporated by reference in its entirety.

In the above disclosure, it has been explained that the function equivalent to those provided by a conventional single forward-facing radar can be provided by performing sensor fusion on signals from two corner-mounted mounted radar sensors (or other active sensors). However, the above explanation is not be taken to preclude that the vehicle is or may be fitted with other active sensors including radar sensors, for example with one or two radar sensors arranged at the rear of the vehicle to detect objects behind the vehicle, additional radar sensors provided on each side of the vehicle at, for example, a position intermediate along the body of the vehicle between front and rear, for example at the so-called B-pillar of the vehicle, or forward of the intermediate position but at least partially rear-facing without any forward region of overlap, to detect objects alongside the vehicle. Moreover, other sensors such as ultrasonic sensors, which are short-range active sensors having ranges much shorter than, for example, radar sensors, may be provided, for example, to provide parking assistance.

By implementing the present disclosure, a dedicated forward-facing radar arranged at the front of the vehicle for detecting objects located along the centerline of the vehicle for the purposes of automated emergency braking or adaptive cruise control, for example, may be rendered superfluous and therefore may be dispensed with.

It may therefore be characteristic of vehicles 1100 equipped with the ADAS and being an embodiment of the present disclosure that they have no radar sensor arranged at a front of the vehicle, facing longitudinally forward, in particular on or close to the centerline of the vehicle. It may also be characteristic of vehicles 1100 equipped with the ADAS and being an embodiment of the present disclosure that they have only two radar sensors arranged forward of a midpoint of the vehicle, facing at least partially forward.

Figure 7:
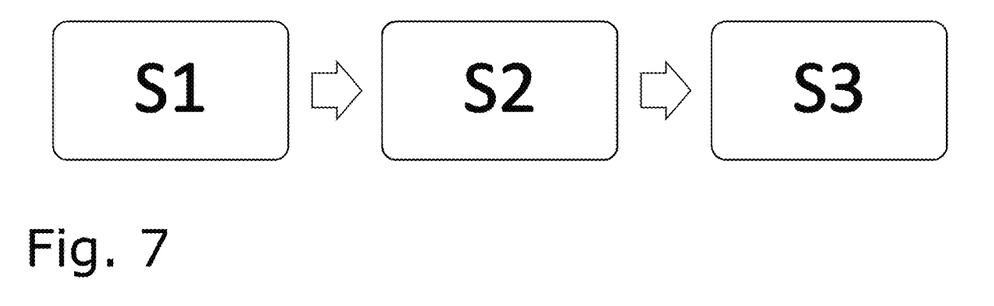
FIG. 7 shows a flow diagram of a driver assistance method of the present disclosure.

FIG. 7 shows a flowchart which may represent conceptual processes in implementing an example method of the present disclosure and is described below.

In a first step S1, signals are received from a plurality of active object-detection sensors. The plurality of active object-detection sensors are mounted at the vehicle. The plurality of sensors comprises two radar sensors. The two radar sensors are mounted at opposite locations on the vehicle relative to a longitudinal centerline of the vehicle. A center of a field of view of each radar sensor is directed away from the centerline. The field of view of each radar sensor overlaps with the field of view of the other radar sensor in a region of overlap crossing the centerline and forward of the vehicle.

In a second step S2, the presence of an object in the region of overlap is determined on the basis of signals from, among the plurality of active object-detection sensors, only each of the two radar sensors.

In a third step S3, a command for autonomously actuating the braking of the vehicle is outputted. The output is the basis of signals from, among the plurality of active object-detection sensors, only each of the two radar sensors. The signals represent the presence of an object in the region of overlap.

In the above disclosure, ADAS controller 1115, for example, has been represented as a data processing device having distinct modules, for ease of explanation. However, the operations of this device may be performed, for example, by an industrial programmable logic controller, or commodity data processing hardware such as a portable computing device equipped with appropriate interfaces, and executing modular or monolithic program code.

While this disclosure has been described in terms of the preferred embodiments, is not intended to be so limited, but rather only to the extent set forth in the claims that follow.

What is claimed is:

1. A driver assistance system for a vehicle, the driver assistance system comprising:
    a plurality of active object-detection sensors for mounting at the vehicle, the plurality of active object-detection sensors comprising two radar sensors mounted at opposed locations on the vehicle relative to a longitudinal centerline of the vehicle, a center of a field of view of each radar sensor being directed away from the centerline and the field of view of each radar sensor overlapping with the field of view of the other radar sensor in a region of overlap crossing the centerline and forward of the vehicle, an angular discrimination of each radar sensor of the two radar sensors being at least four degrees in an azimuth direction and at a facing direction of the radar sensor,
wherein the angular discrimination is an angular separation of objects which can be resolved by the two radar sensors; and
a controller configured to execute a decision engine that determines a presence of an object in the region of overlap based only on signals received from only each of the two radar sensors; the decision engine being further configured to output, based on the presence of the object in the region of overlap, a command for an operation of the vehicle.

2. The driver assistance system of claim 1, wherein the decision engine outputs a command for autonomously actuating braking or acceleration of the vehicle based on the signals received from the two radar sensors.

3. The driver assistance system of claim 1, wherein the field of view of each radar sensor is at least 90 degrees.

4. The driver assistance system of claim 1, wherein a detection range of each radar sensor is at least 150 meters.

5. The driver assistance system of claim 1, wherein the decision engine receives an actual speed measurement of the vehicle and a demanded speed measurement of the vehicle and outputs a command for an operation of the vehicle to regulate a speed of the vehicle relative to the object in the region of overlap.

6. The driver assistance system of claim 5, wherein the decision engine outputs the command to regulate the speed of the vehicle at speeds of at least 100 kilometers/hour.

7. The driver assistance system of claim 1, wherein the decision engine outputs a command for autonomously actuating braking or acceleration of the vehicle when the region of overlap is at a distance of at least 75 meters from the vehicle or at least 100 meters from the vehicle.

8. The driver assistance system of claim 1, wherein the two radar sensors are arranged forward of a longitudinal midpoint of the vehicle.

9. The driver assistance system of claim 8, wherein the two radar sensors are arranged at respective front corners of the vehicle relative to the longitudinal midpoint.

10. The driver assistance system of claim 8, wherein the two radar sensors are arranged with a facing direction rearward of the longitudinal midpoint of the vehicle.

11. The driver assistance system of claim 1, wherein the two radar sensors have a radio frequency of one or more of at least 76 gigahertz or not exceeding 81 gigahertz.

12. The driver assistance system of claim 1, further comprising:
an imaging sensor for mounting with an imaging field of view overlapping with the region of overlap of the fields of view of the two radar sensors,
where the decision engine determines the presence of the object in the region of overlap based further on additional signals from the imaging sensor representing the presence of the object in the region of overlap.

13. The driver assistance system of claim 12, wherein the decision engine outputs a command for autonomously actuating braking or acceleration of the vehicle based further on the additional signals from the imaging sensor.

14. The driver assistance system of claim 13, wherein the imaging sensor comprises a camera with a resolution of at least 1 megapixels or at least 4 megapixels.

15. The driver assistance system of claim 13, wherein the imaging sensor comprises a camera with a total field of view of at least 90 degrees or at least 120 degrees.

16. The driver assistance system according to claim 1, wherein the driver assistance system is equipped on the vehicle.

17. A method, the method comprising:
receiving signals from a plurality of active object-detection sensors mounted at a vehicle, the plurality of sensors comprising two radar sensors mounted at opposite locations on the vehicle relative to a longitudinal centerline of the vehicle, a center of a field of view of each radar sensor directed away from the centerline and the field of view of each radar sensor overlapping with the field of view of the other radar sensor in a region of overlap crossing the centerline and forward of the vehicle, an angular discrimination of each radar sensor of the two radar sensors being at least four degrees in an azimuth direction and at a facing direction of the radar sensor,
wherein the angular discrimination is an angular separation of objects which can be resolved by the two radar sensors;
determining a presence of an object in the region of overlap based only on signals received from only each of the two radar sensors; and
outputting, based on the presence of the object in the region of overlap, a command for an operation of the vehicle.

18. A non-transitory computer-readable storage medium comprising instructions that, when executed, configure a controller for a vehicle to execute a decision engine that:
receives signals from a plurality of active object-detection sensors mounted at the vehicle, the plurality of sensors comprising two radar sensors mounted at opposite locations on the vehicle relative to a longitudinal centerline of the vehicle, a center of a field of view of each radar sensor directed away from the centerline and the field of view of each radar sensor overlapping with the field of view of the other radar sensor in a region of overlap crossing the centerline and forward of the vehicle, an angular discrimination of each radar sensor of the two radar sensors being at least four degrees in an azimuth direction and at a facing direction of the radar sensor,
wherein the angular discrimination is an angular separation of objects which can be resolved by the two radar sensors;
determines a presence of an object in the region of overlap based only on signals received from only each of the two radar sensors; and
outputs, based on the presence of the object in the region of overlap, a command for an operation of the vehicle.

19. The non-transitory computer-readable storage medium of claim 18, wherein the command comprises a command for autonomously actuating braking or acceleration of the vehicle based on the signals received from the two radar sensors.

20. The non-transitory computer-readable storage medium of claim 18, wherein the field of view of each radar sensor is at least 90 degrees.

* * * * *